Figure 1:
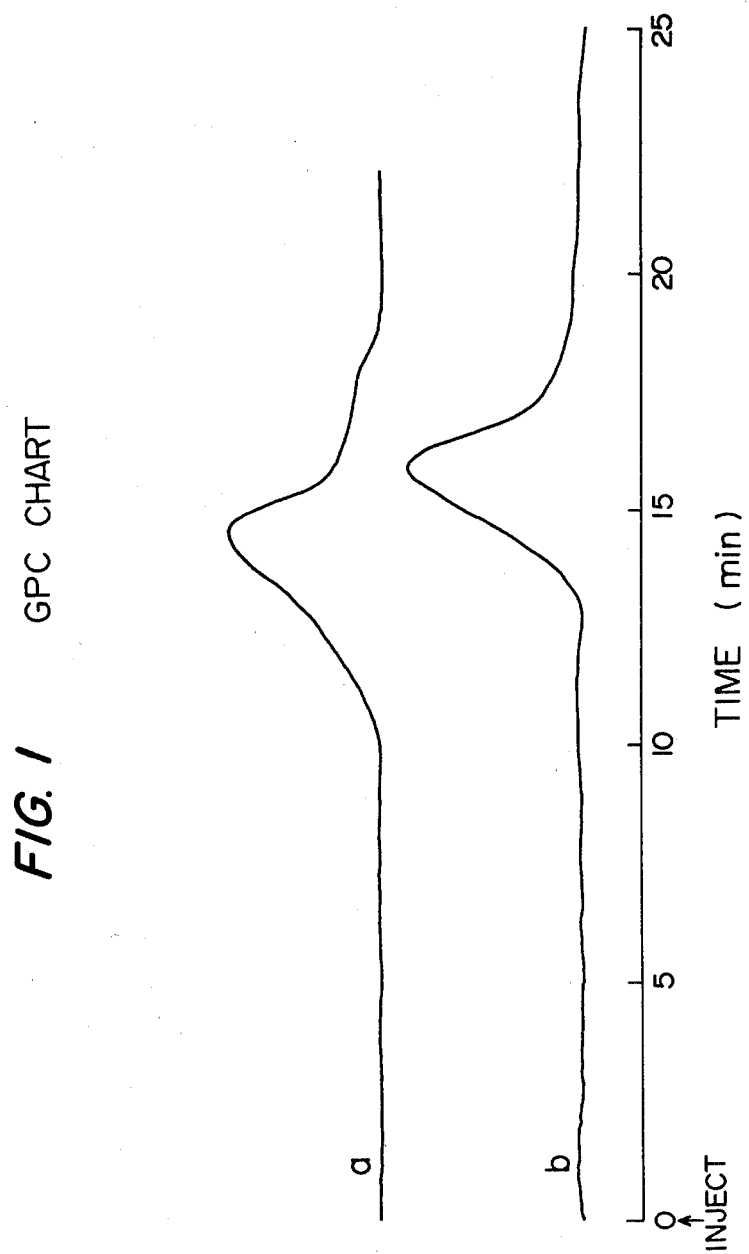

United States Patent [19]

Sugie et al.

[11] 4,393,113

[45] Jul. 12, 1983

[54] NOVEL SILICON-CONTAINING COPOLYMER, ULTRATHIN SOLID MEMBRANE COMPOSED OF SAID COPOLYMER, USE OF SAID SOLID MEMBRANE FOR CONCENTRATING A SPECIFIED GAS IN A GASEOUS MIXTURE, AND PROCESS FOR PRODUCING SAID SOLID MEMBRANE

[75] Inventors: Kiyoshi Sugie; Takeyoshi Yamada; Teizo Yamaji, all of Iwakuni, Japan

[73] Assignee: Teitin Limited, Osaka, Japan

[21] Appl. No.: 270,128

[22] Filed: Jun. 3, 1981

[30] Foreign Application Priority Data

Jun. 5, 1980 [JP] Japan .................................. 55-74860
Apr. 20, 1981 [JP] Japan .................................. 56-58443

[51] Int. Cl.$^3$ ..................... B01D 13/00; C08F 230/08
[52] U.S. Cl. ........................................ 428/220; 55/16; 55/158; 156/246; 210/500.2; 264/298; 428/333; 428/447; 526/279
[58] Field of Search .......................... 526/279; 55/158; 210/500.2; 428/220

[56] References Cited

U.S. PATENT DOCUMENTS 3,125,554  3/1964  Cooper et al. ...................... 526/279
3,611,676 10/1971  Christen et al. ...................... 55/16
3,644,306  2/1972  Longi et al. .......................... 526/279
3,754,375  8/1973  Bouchilloux et al. ................... 55/16
4,132,824  1/1979  Kimura et al. ....................... 428/220
4,155,793  5/1979  Salemme et al. .................... 156/246
4,192,842  3/1980  Kimura et al. ....................... 264/298
4,199,445  4/1980  Chiang et al. ..................... 210/500.2

FOREIGN PATENT DOCUMENTS 899945  6/1962  United Kingdom .
1480519  7/1977  United Kingdom .

OTHER PUBLICATIONS

CA, 73, 15364c (1970).
J. Pol. Sci, 31, No. 122, pp. 181-183 (1958).
Bull. Chem. Soc., Japan, 32, No. 7, pp. 670-674 (1959).

Primary Examiner—Stanford M. Levin
Attorney, Agent, or Firm—Sherman & Shalloway

[57] ABSTRACT

An ultrathin solid membrane is composed substantially of a silicon-containing copolymer consisting substantially of recurring units derived from a silicon-containing allyl monomer and an ethylenically unsaturated monomer and/or a diene monomer. The ultrathin solid membrane is useful for obtaining a specified gas, such as oxygen, in a concentrated state, from a mixture of two or more gases, such as air.

13 Claims, 7 Drawing Figures

NMR SPECTRA

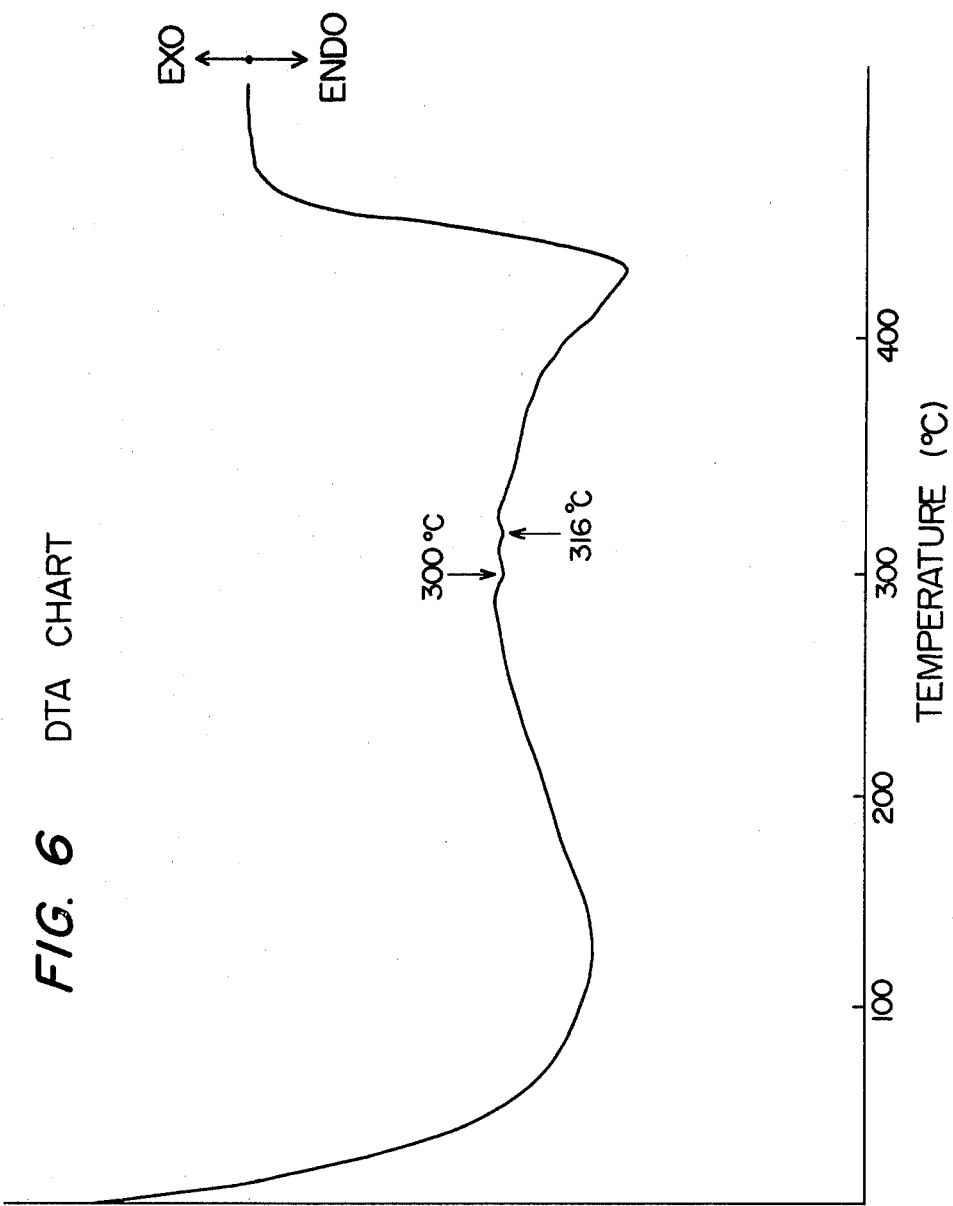
FIG. 6  DTA CHART

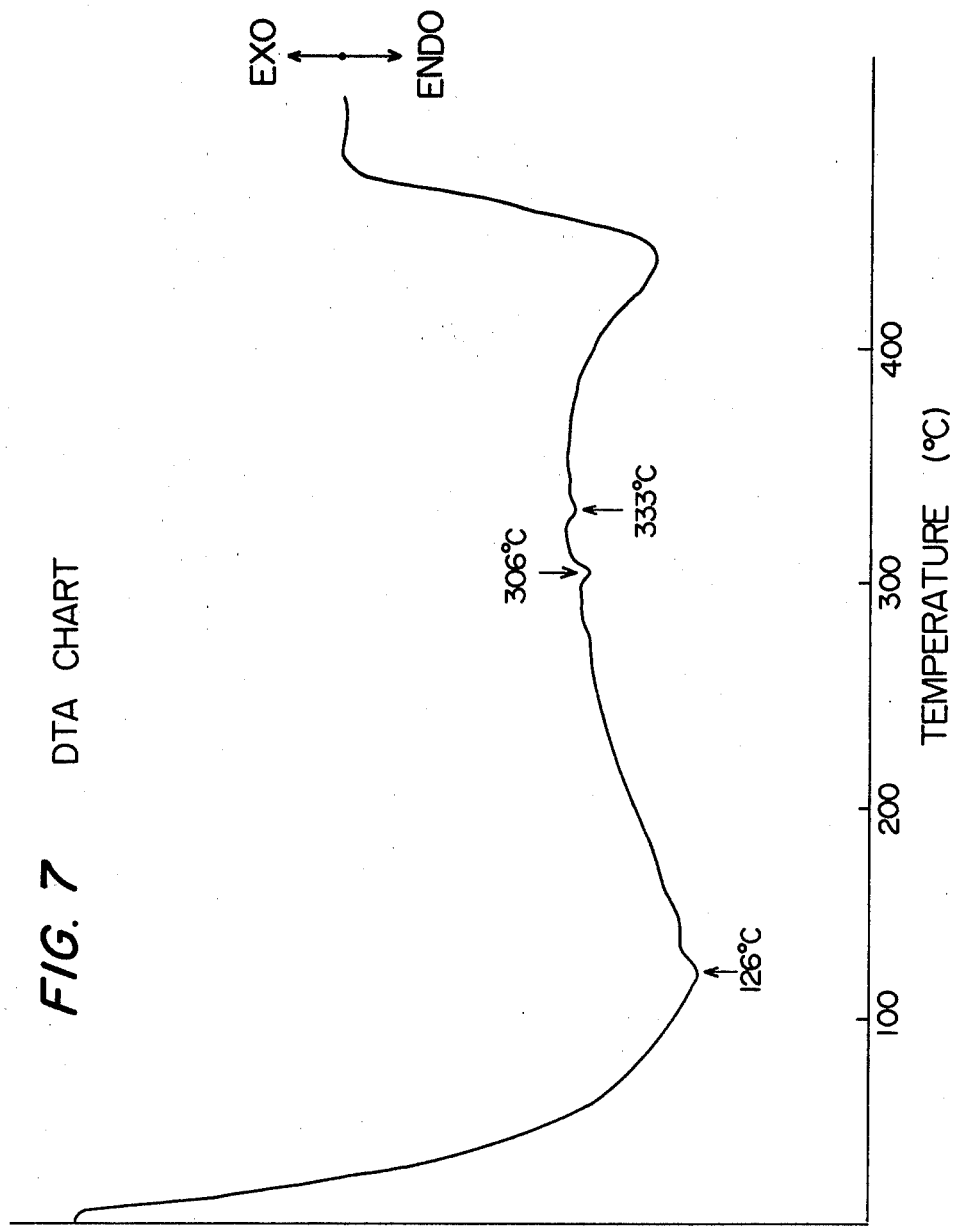
FIG. 7 DTA CHART

NOVEL SILICON-CONTAINING COPOLYMER, ULTRATHIN SOLID MEMBRANE COMPOSED OF SAID COPOLYMER, USE OF SAID SOLID MEMBRANE FOR CONCENTRATING A SPECIFIED GAS IN A GASEOUS MIXTURE, AND PROCESS FOR PRODUCING SAID SOLID MEMBRANE

This invention relates to an ultrathin solid membrane composed of a novel silicon-containing copolymer which can be used for concentrating a specified gas from a gaseous mixture, and a process for producing said solid membrane is disclosed.

Silicon-containing addition polymers heretofore known include, for example, a homopolymer of vinyltrimethylsilane (Japanese Patent Publication No. 51,715/1972), homopolymers or copolymers of vinyl organosilanes (Japanese Patent Publication No. 21021/1972 and Japanese Laid-Open Patent Publication No. 38381/1976), a homopolymer of allyltrimethylsilane (Journal of Polymer Science, Vol. XXXI, No. 122, 1958, page 181), homopolymers of $CH_2=CH-(CH_2)_x-Si(CH_3)_3$ in which x is 0, 1 or 2 (Bull. Chem. Soc. Japan, June 1959, Vol. 32, No. 7, page 670), and a copolymer of allyltrimethylsilane or allyldimethylmonophenylsilane with acrylonitrile (Chemical Abstracts, 1970, Vol. 73, 15364c).

The above-cited Japanese Patent Publications Nos. 51,715/1972 and 21,021/1977 and Japanese Laid-Open Patent Publication No. 38,381/1976 gave a disclosure about the film-formability of silicon-containing addition polymers and the utility of films of these polymers as gas-permeable membranes. The silicon-containing addition polymers disclosed in these prior art documents are homopolymers or copolymers of vinyl triorganosilanes which embrace vinyltrimethylsilane.

No prior art reference, however, discloses the film-formability of homopolymers or copolymers of allylsilanes, and therefore films of these polymers have not been known heretofore.

As an attempt to provide an ultrathin solid membrane of a silicon-containing polymer, U.S. Pat. No. 4,192,842 proposed an ultrathin solid membrane produced from a solution of a blend of a methylpentene polymer and an organopolysiloxane-polycarbonate copolymer in an organic solvent. This film, however, is not composed of a silicon-containing polymer alone, nor is the polymer a silicon-containing addition polymer.

It is an object of this invention therefore to provide a novel silicone-containing addition polymer.

Another object of this invention is to provide a novel allylsilane-type copolymer containing silicon in varying proportions.

Still another object of this invention is to provide an allylsilane-type copolymer which has various superior properties, especially superior processability and film-formability, to a homopolymer of allylsilane.

Yet another object of this invention is to provide an ultrathin membrane having a thickness of, for example, about 50 to about 3,000 Å which is obtained from the aforesaid allylsilane-type copolymer.

A further object of this invention is to provide an ultrathin solid membrane having the excellent ability to separate gases based on their different permeabilities, which can be used to produce a concentrated gas from a mixture of two or more gases, for example, an oxygen-enriched gas from air.

A still further object of this invention is to provide an ultrathin solid membrane having an excellent selectivity and excellent permeation velocity.

A yet further object of this invention is to provide an ultrathin solid membrane which shows a substantially equivalent selectivity to, and a better permeation velocity than, an ultrathin solid membrane of a polymer of 4-methylpentene-1 which has previously been known to exhibit the best gas separability.

It is also an object of this invention to provide a unit element for gas separation composed of the aforesaid ultrathin solid membrane, a module built by assembling a plurality of such unit elements, and an apparatus for gas concentration having the aforesaid module, for example an oxygen enricher.

Other objects and advantages of this invention will become apparent from the following description.

These objects and advantages are achieved in accordance with this invention by a film-forming silicon-containing copolymer consisting substantially of (a) at least one recurring unit of the following formula

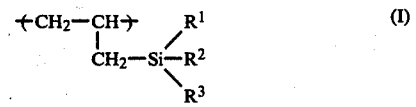

(I)

wherein $R^1$, $R^2$ and $R^3$ are identical or different, and each represents an alkyl group having 1 to 10 carbon atoms, or a phenyl group which may be substituted by an alkyl group having 1 to 4 carbon atoms, and (b) at least one recurring unit of the formula

(II-1)

wherein $R^4$ represents a hydrogen atom or an alkyl group having 1 to 3 carbon atoms, and $R^5$ represents a hydrogen atom, an alkyl or alkenyl group having 1 to 20 carbon atoms, or a phenyl group which may be substituted by an alkyl group having 1 to 4 carbon atoms, and/or at least one recurring unit of the formula

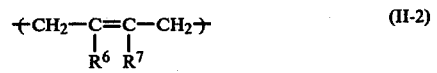

(II-2)

wherein $R^6$ and $R^7$ are identical or different, and each represents a hydrogen atom, a chlorine atom, or a methyl group.

According to this invention, the silicon-containing copolymer can be produced by copolymerizing a silicon-containing allyl monomer of the following formula

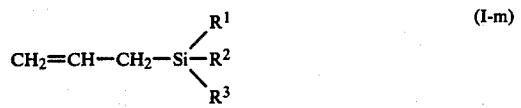

(I-m)

wherein $R^1$, $R^2$ and $R^3$ are as defined hereinabove, and an ethylenically unsaturated monomer of the following formula $$R^4-CH=CH-R^5 \quad \text{(II-1-m)}$$

wherein $R^4$ and $R^5$ are as defined hereinabove, and/or a diene unsaturated monomer of the following formula $$CH_2=C-C=CH_2 \quad \text{(II-2-m)}$$
$$\phantom{CH_2=}\underset{R^6}{|}\;\underset{R^7}{|}$$

wherein $R^6$ and $R^7$ are as defined hereinabove, in the presence of a Ziegler-Natta catalyst in an aprotic inert solvent at a temperature of about 10° to about 120° C.

The silicon-containing allyl monomer of formula (I-m) gives the recurring unit of formula (I) in the silicon-containing copolymer of this invention.

In formula (I-m), $R^1$, $R^2$ and $R^3$ are identical or different, and each represents an alkyl group having 1 to 10 carbon atoms or a phenyl group which may be substituted by an alkyl group having 1 to 4 carbon atoms. The alkyl group having 1 to 10 carbon atoms includes linear or branched alkyl groups, for example, methyl, ethyl, n-propyl, iso-propyl, n-butyl, iso-butyl, tert-butyl, n-pentyl, n-hexyl, n-heptyl, n-octyl, n-nonyl, and n-decyl. Of these, linear or branched alkyl groups having 1 to 5 carbon atoms are preferred.

The alkyl substituent having 1 to 4 carbon atoms on the phenyl group includes, for example, linear or branched alkyl groups having 1 to 4 carbon atoms such as methyl, ethyl, n-propyl, iso-propyl, tert-butyl, and iso-butyl.

Preferred allyl monomers of formula (I-m) are those in which $R^1$ and $R^2$ are identical or different alkyl groups having 1 to 5 carbon atoms and $R^3$ is an alkyl group having 1 to 8 carbon atoms or a phenyl group. Especially preferred is that of formula (I-m) in which all of $R^1$, $R^2$ and $R^3$ are methyl groups, that is allyltrimethylsilane.

Thus, examples of the silicon-containing allyl monomers of formula (I-m) are allyltrimethylsilane, allyltriethylsilane, allyltri-n-butylsilane, allyltri-tert-butylsilane, allyltri-n-decylsilane, allyldimethyl-n-propylsilane, allyldimethyl-tert-butylsilane, allyldimethyl-n-octylsilane, allyltriphenylsilane, allylmethyldiphenylsilane, allyldimethylphenylsilane, and allyldimethyltolylsilane.

These allyl monomers are used either singly or as a mixture of two or more.

The monomers of formulae (II-1-m) and (II-2-m) give the recurring units of formulae (II-1) and (II-2) in the silicon-containing copolymer of this invention.

To produce the silicon-containing copolymer of this invention, the ethylenically unsaturated monomer of formula (II-1-m), or the diene unsaturated monomer of formula (II-2-m), or a mixture of these monomers is used in this invention.

In formula (II-1-m), $R^4$ is a hydrogen atom or an alkyl group having 1 to 3 carbon atoms, and $R^5$ is a hydrogen atom, an alkyl or alkenyl group having 1 to 20 carbon atoms, or a phenyl group which may be substituted by an alkyl group having 1 to 4 carbon atoms.

The alkyl groups having 1 to 3 carbon atoms for $R^4$ are methyl, ethyl, n-propyl, and iso-propyl. Examples of the alkyl groups or alkenyl groups having 1 to 20 carbon atoms for $R^5$ include linear or branched alkyl groups such as undecyl, dodecyl, tridecyl, tetradecyl, pentadecyl, hexadecyl, heptadecyl, octadecyl, nonadecyl, and eicosanyl in addition to those exemplified hereinabove with regard to $R^1$, $R^2$ and $R^3$, and linear or branched alkenyl groups such as vinyl, 2-propenyl, isopropenyl, 3-butenyl, 4-pentenyl, 2,5-hexadienyl, 5-hexenyl, 7-octenyl, and 9-decenyl.

The alkyl substituent on the phenyl group may include those which are exemplified hereinabove with regard to $R^1$, $R^2$ and $R^3$.

Preferred ethylenically unsaturated monomers of formula (II-1-m) are those in which $R^4$ is a hydrogen atom or an alkyl group having 1 to 3 carbon atoms, and $R^5$ is a hydrogen atom or an alkyl or alkenyl group having 1 to 6 carbon atoms. More preferred are those of formula (II-1-m) in which $R^4$ is a hydrogen atom, and $R^5$ is an alkyl group having 2 to 6 carbon atoms. Ethylenically unsaturated monomers of formula (II-1-m) in which $R^4$ is a hydrogen atom and $R^5$ is butyl, pentyl or hexyl are especially preferred.

Thus, examples of the ethylenically unsaturated monomers of formula (II-1-m) are ethylene, propylene, butene-1, butene-2, pentene-1, 4-methylpentene-1, hexane-1, 4-methylhexane-1, 5-methylhexene-1, heptene-1, 4-methylheptene-1, decene-1, dodecene-1, tetradecene-1, hexadecene-1, octadecene-1, butadiene, dimethylbutadiene, isoprene, pentadiene, 1,5-hexadiene, and 1,6-heptadiene.

These ethylenically unsaturated monomers can be used either singly or as a mixture of two or more.

The monomer of general formula (II-1-m) gives the recurring unit of formula (II-1) in the silicon-containing copolymer of this invention. When the monomer of general formula (II-1-m) is a compound having two double bonds, such as butadiene, isoprene or hexadiene, such a compound undergoes 1,2-addition polymerization to give the recurring unit of formula (II-1).

In formula (II-2-m), $R^6$ and $R^7$ are identical or different, and each represents a hydrogen atom, a chlorine atom, or a methyl group.

A preferred diene unsaturated monomer of formula (II-2-m) is that in which $R^6$ is a hydrogen atom, and $R^7$ is a hydrogen atom or a methyl group.

Thus, examples of preferred diene unsaturated monomers are butadiene, isoprene, chloroprene, and dimethylbutadiene.

These monomers of formula (II-2-m) undergo 1,4-addition polymerization to give the recurring unit of formula (II-2).

The silicon-containing copolymer of this invention is produced by copolymerizing the silicon-containing allyl monomer of formula (I-m) and the ethylenically unsaturated monomer of formula (II-1-m) and/or the diene unsaturated monomer of formula (II-2-m) in the presence of a Ziegler-Natta catalyst in an aprotic inert organic solvent at a temperature of about 10° to about 120° C.

Combinations of transition metal halides or oxyhalides and alkylated products of metals other than transition metals, for example, can be widely used as the Ziegler-Natta catalyst. The transition metals are metals of Groups IVa, Va, VIa, VIIa and VIII of the periodic table, such as Ti, Zr, V, Cr, MO, W, Mn, and Fe. Examples of the other metals than the transition metals are metals of Groups II and III of the periodic table, such as Be, Al, Mg, and Zn. Examples of preferred halides or oxyhalides of transition metals are $TiCl_3$, $TiCl_4$, $VCl_5$, $VOCl_3$. Examples of the alkylated metals are trialkyl aluminums, above all triethyl aluminum.

Preferably, the transition metal halide or oxyhalide and the alkylated product of a metal other than the transition metals are used in such proportions that the atomic ratio of the transition metal to the other metal is from 1:1 to 10:1, especially from 1:1 to 6:1.

The aprotic inert solvent, preferably, includes aliphatic, alicyclic and aromatic hydrocarbons. Advantageously used are aliphatic hydrocarbons such as n-hexane, n-heptane, ligroin and petroleum ether, alicyclic hydrocarbons such as cyclohexane and decalin, and aromatic hydrocarbons such as benzene, toluene, xylene, and mixed xylene. Preferably, the solvents are used after dehydration.

The reaction is carried out usually at about 10° to about 120° C., preferably about 20° to about 100° C. The reaction is preferably carried out in an inert atmosphere under normal atmospheric pressure to elevated pressures. The reaction time varies depending upon the types of the monomers used, especially the type of the silicon-containing allyl monomer, and the proportions of the monomers charged, the reaction temperature, etc. Generally, it is several hours to about 1 week.

After the polymerization, such an aprotic inert solvent as mentioned aove is generally added to the polymerization reaction mixture to dilute it, and a protonic solvent such as methanol is added to deactivate the catalyst. The mixture is washed with an acidic aqueous solution such as hydrochloric acid, and reprecipitated with an alcohol such as methanol. The precipitated silicon-containing copolymer is then isolated.

The silicon-containing copolymer consisting substantially of the recurring units of formulae (I) and (II-1) and/or (II-2) derived from the monomers of formulae (I-m) and (II-1-m) and/or (II-2-m) can be obtained in various silicon contents by varying the types and proportions of the monomers used.

The present invention preferably provides copolymers having various silicon contents consisting substantially of at least one recurring unit of formula (I) and at least one recurring unit of formula (II-1), and copolymers having various silicon contents consisting substantially of at least one recurring unit of formula (I), at least one recurring unit of formula (II-1) and at least one recurring unit of formula (II-2). The copolymers consisting of the aforesaid two types of recurring units are particularly advantageous.

Specifically, this invention provides silicon-containing copolymers in which the proportion of the recurring unit of formula (I) is about 5 to about 95 mole%, preferably about 20 to about 80 mole%, of the entire recurring units of the copolymer.

According to this invention, the silicon-containing copolymer can be obtained in various degrees of polymerization, for example in an inherent viscosity, determined at 25° C. for a solution of 0.5 g of the copolymer in 100 cc of cyclohexene, of about 0.5 to about 4.0, preferably about 1.0 to about 3.0.

The silicon-containing copolymers provided by this invention have various superior properties, especially superior processability and film-formability, to homopolymers of allylsilanes, and can be formed into ultrathin solid membranes by utilizing these properties. The solid membranes provided by this invention have a thickness of as small as about 50 to about 3,000 Å, for example.

Since, as shown hereinbelow, these ultrathin solid membranes show excellent selectivity and high permeation velocities for various gases, they can be advantageously used to produce rapidly a specified gas in a highly concentrated state from a mixture of two or more gases.

In order to produce an ultrathin solid membrane from the silicon-containing copolymer of the invention, the present invention also provides a process which comprises dissolving the copolymer in a solvent composed mainly of a volatile, substantially water-immiscible organic liquid medium capable of dissolving the silicon-containing copolymer, said solvent containing, if desired, another organic compound having a distribution coefficient k, which is the ratio of the concentration of the other organic compound in the organic liquid medium so that in water, of from 0.5 to 35, and said solvent meeting the following equation $$c_1 - (a_1 + b_1) \geq 25$$

wherein $c_1$ is the surface tension (dynes/cm) of water, $a_1$ is the surface tension (dynes/cm) of the solution of the silicon-containing copolymer in the solvent, and $b_1$ is the interfacial tension (dynes/cm) between the solvent solution and water, and thereafter allowing the solvet solution of the silicon-containing copolymer to spread spontaneously on the surface of a liquid support consisting substantially of water where-by the solvent in the solvent solution is removed to an amount sufficient to form a solid membrane on the liquid surface.

The procedure of the process of this invention involves dissolving the silicon-containing copolymer in a solvent composed mainly of a substantially water-immiscible organic liquid medium, and allowing the resulting solvent solution to spread spontaneously on the surface of a liquid support consisting substantially of water.

In the process of the present invention, there is used a volatile organic liquid medium capable of dissolving the silicon-containing copolymer as the substantially water-immiscible organic liquid medium, and a solvent consisting mainly of the aforesaid organic liquid medium has liquid surface characteristics meeting the following equation, $$c_1 - (a_1 + b_1) \geq 25 \qquad (1\text{-a})$$

preferably $$c_1 - (a_1 + b_1) \geq 35 \qquad (1\text{-b})$$

wherein all symbols are as defined above.

By using a medium having such liquid surface properties, the resulting solvent solution of the silicon-containing copolymer spreads spontaneously, uniformly and rapidly on the surface of a liquid support consisting substantially of water.

In the present invention, a mixture of a certain kind of medium as described above and another organic compound having a distribution coefficient (k) of from 0.5 to 35, preferably from 1.0 to 25, is preferred as the solvent composed mainly of such a medium. The distribution coefficient (k) is the ratio of the concentration of the other organic compound in the organic liquid medium to that in water.

The silicon-containing copolymer is used as a solvent solution in a concentration of about 0.5 to about 15% by weight, preferably about 1 to about 10% by weight.

Since the silicon-containing copolymer of this invention generally has the property of dissolving in various solvents, selection of suitable solvents in the preparation of the solvent solution is easy.

For example, hydrocarbons as halogenated hydrocarbons can be used as the water-immiscible liquid medium capable of forming a solvent used to prepare such a solvent solution. Preferably, they are alicyclic or aromatic compounds, such as cyclohexene, cyclohexane, decalin, benzene, toluene, xylene, tetralin, chloroform, trichloroethylene, tetrachloroethylene, trichloroethylene, trichloropropane, chlorobenzene, dichlorobenzene, chloronaphthalene, and mixtures of these.

These water-immiscible organic liquid media are volatile and can dissolve the aforesaid silicon-containing copolymers but when used alone, they do not have the liquid surface properties defined by equation (1-a).

Solvents which meet equation (1-a) are provided by mixing such a water-immiscible organic liquid medium with another organic compound having a distribution coefficient, k, of 0.5 to 35, preferably 1.0 to 25. Solvents of this type are preferred in the process of this invention.

Examples of the other organic compound are alicyclic or aromatic alcohols, ketones, amines, aldehydes, carboxylic acids, hydroperoxides and mixtures of these. For example, cyclohexenol, cyclohexanol, phenol, cyclohexenone, cyclohexylamine, aniline, furfural, benzoic acid, cyclohexenyl hydroperoxide, and mixtures of these are especially preferred.

The amount of the other organic compound is about 0.1 to about 15% by weight, preferably about 0.5 to about 10% by weight, based on the solvent.

The presence of the other organic compound in the solvent serves to convert a water-immiscible organic liquid medium, which despite its volatility and ability to dissolve the silicon-containing copolymer used in this invention, cannot by itself be used in the process of this invention for producing an ultrathin solid membrane having a uniform thickness, a large area, and a substantially equivalent gas separation factor to the inherent gas separation factor of the silicon-containing copolymer, into a solvent suitably used in the process of this invention.

It is believed that the other organic compound is mostly removed by being dissolved in the liquid support consisting substantially of water from the solvent solution of the silicon-containing copolymer in the liquid support. Since most of the water-immiscible organic liquid medium in the solvent solution is removed by volatilization on the liquid support, the process of this invention may be expressed phenomenally as a process for producing a very thin solid membrane on a liquid support by using a compound soluble in the liquid support and a water-immiscible organic liquid medium which volatilizes into the ambient atmosphere.

The ultrathin solid membrane obtained by the process of this invention, therefore, is composed of the silicon-containing copolymer not containing the other organic compound in a substantially appreciable amount without subjecting it to any special treatment after it has been separated from the liquid support.

The process of this invention is carried out by feeding the solvent solution of the silicon-containing copolymer gently onto a liquid support consisting substantially of water. The solvent solution, as already described hereinabove, spontaneously spreads on the surface of the liquid support. Accordingly, no special operation is required for spreading the solvent solution. The solvent solution releases the solvent therefrom while spreading, and gradually solidifies on the surface of the liquid support. Releasing of the solvent, namely the removal of the solvent from the solvent solution, does not require any special operation, as already stated hereinabove.

The surface of the liquid support should not be vibrated, or the thin film should not be rippled at least before it is solidified on the liquid surface.

The solvent solution is fed to the liquid support from a feed means which is in contact with the surface of the liquid support or is provided in its neighborhood. Desirably, the feeding is effected in the direction of gravity. When the solvent solution is to be fed from a feed means provided in the vicinity of the liquid surface, the feed means may be situated above or below the liquid surface. The feed means may be a feed opening. When it is located on the liquid surface, it may be a slender linear material. In this case, the solvent solution is fed along the slender linear material. The suitable length of the linear material is less than about 10 cm, preferably less than about 5 cm. The feed means may be positioned up to about 3 mm, preferably up to about 2 mm, above the liquid surface, or up to about 2 mm, preferably up to about 1 mm below the liquid surface.

When the feed means is a feed opening, it may be of any shape if it is adapted to feed the solvent solution continuously or intermittently at such a rate that the solvent solution fed onto the liquid surface spontaneously spreads and forms a solid membrane having a uniform thickness. Since the solvent solution is usually fed as a dilute solution of the addition polymer, the feed opening preferably does not have so large an area. Usually, a slit of narrow width, a slender linear material, or a feed opening of a small area having any desired shape such as a circle or polygon is usually employed. The slit having a narrow width preferably has an opening width of about 0.001 to about 1 mm. The circular or polygonal feed opening with a small area preferably has an opening area of about 0.01 to about 3 mm$^2$, preferably 0.05 to about 2 mm$^2$.

Preferably, the feed means is a circular or polygonal (e.g., triangular, hexagonal, etc.) opening with a small area. Such a feed means may be the tip of a slender hollow tube, and the tip may be sharpened.

The solvent solution fed to the liquid support spreads rapidly and spontaneously on the liquid surface, and simultaneously with, or subsequently to, the spreading, gradually releases the solvent and finally solidifies, as stated hereinabove.

The temperature of the solvent solution at the time of feeding is a factor which affects surface tension and interfacial tension, but is not so important from the standpoint of controlling these tensions because it is believed that the temperature of the solvent solution fed to the liquid support rapidly approaches the temperature of the liquid support. Rather, the temperature of the solvent solution at the time of feeding is significant as a temperature which gives the solvent solution. From this standpoint, therefore, the temperature of the solvent solution may be about 10° to about 150° C., preferably about 20° to about 120° C.

As stated above, the temperature of the solvent solution fed to the liquid support is believed to approach the temperature of the liquid support rapidly. Accordingly, the temperature of the liquid support affects the surface tensions of the solvent solution and the liquid support and the interfacial tension between them and also greatly affects the speed or degree of spontaneous spreading of the solvent solution on the liquid suppport. Thus, when the temperature of the liquid support is too high, volatilization of the solvent from the solvent solution increases too much, and the desired speed and degree of spreading are difficult to obtain. On the other hand, when the temperature of the liquid support is too low, the volatilization of the solvent is too slow, and the speed of solidification is decreased.

In the process of this invention, the temperature of the liquid support is generally about 0° to about 80° C., preferably about 1° C. to about 70° C., more preferably about 3° C. to about 50° C.

For example, when in accordance with the process of this invention, one drop of a solution of 5 parts by weight of an allyltrimethylsilane and 4-methylpentene-1 in a solvent consisting of 2.85 parts by weight of cyclohexenyl hydroxyperoxide and 92.15 parts by weight of cyclohexene is fed onto a liquid support composed of water from a feed opening having an opening area of about 0.1 mm², the solvent solution spontaneously spreads on the liquid surface immediately upon feeding, and solidifies in several seconds, for example 1 to 2 seconds, to form a solid membrane.

The process of this invention can be performed either batchwise or continuously. By the batchwise operation, a solidified membrane is formed intermittently on the surface of the liquid support, and by the continuous operation, a long continuous solid membrane is continuously formed on the surface of the liquid support.

The batchwise operation is carried out, for example, by feeding the solvent solution in drops to the liquid support, and the continuous operation is carried out, for example, by continuously feeding the solvent solution onto the liquid support.

According to the continuous process, a solid membrane having a broad area can be easily produced.

According to this invention, the process by the continuous operation is carried out by continuously feeding a solvent solution of an addition polymer onto the surface of a liquid support consisting substantially of water from a feed means so that the solvent solution does not depart from the liquid surface of the liquid support to allow the solvent solution to spread spontaneously on the liquid surface thereby continuously removing the solvent in the solvent solution to an amount sufficient to form a solid membrane, and thereafter continuously withdrawing the ultrathin solid membrane above the liquid surface while carrying it on a porous sheet-like material.

The solid membrane of this invention can also be continuously produced by the process described in U.S. Pat. No. 4,155,793.

Since the solid membrane formed on the liquid support by the process of this invention has a very small thickness, its self-supporting property is low. Accordingly, the solid membrane formed on the liquid support is usually separated from the liquid support by supporting it on another supporting carrier.

The solid membrane formed on the liquid support is carried on a porous sheet-like material and separated from the liquid surface of the support.

The porous sheet-like material makes up for the weak self-supporting ability of the solid membrane of this invention, and scarcely affects the gas separation ability (selectivity, permeation speed) of the solid membrane of this invention.

The porous sheet-like material may be any of sheet-like materials having a number of small pores, smoothness and self-supporting property, such as Japanese paper, nonwoven cloths, synthetic paper-like sheets, filter papers, cloths, wire nets, filtration membranes, ultrafiltration membranes, and porous films. Preferred porous sheet-like materials include porous polyethylene films (e.g., Celpore, a trademark for a product of Sekisui Chemical Co., Ltd.), porous polypropylene films (e.g., Celgard, a trademark for a product of Celanese Corporation), cellulosic ultrafiltration membranes (e.g., Fuji-Microfilter, a trademark for a product of Fuji Film Co., Ltd.), porous polycarbonate films (e.g., Nuclepore, a trademark for a product of Nomura Microscience Co., Ltd.), and polysulfone-type ultrafiltration membranes (e.g., Toyo-ultrafilter, a trademark for a product of Toyo Filter Paper Co., Ltd.).

One or more solid membranes of the invention may be supported on the porous sheet-like material.

It is also possible to support on the porous sheet-like material a laminate of the solid membrane of this invention and another solid membrane having the ability to separate gases such as an ultrathin solid membrane of poly(4-methylpentene-1) (preferably, the total thickness of the solid membranes is about 50 to about 5,000 Å). An assembly of two or more ultrathin solid membranes supported on the porous sheet-like material exhibits excellent gas separating ability when used in separation of gases, and in most cases, shows a gas separation factor equivalent to the inherent gas separation factor of the silicon-containing copolymer forming the solid membrane.

The porous sheet-like material having supported thereon the solid membrane of this invention (which is sometimes referred to hereinbelow as a "composite film") can be used as prepared by the process described above for the separation of gases. Alternatively, before use in such an application, the composite film may be heat-treated under temperature and time conditions which do not cause melting of the solid membrane (for example, in the case of heating in an atmosphere, heating is carried out at a temperature of 10° to 300° C., preferably 20° to 200° C., for a period of 3 seconds to 50 hours, preferably 5 seconds to 20 hours).

The solid membrane of this invention usually has a thickness of about 50 to about 3000 Å.

The solid membrane is used to obtain a gas having a specified component gas concentrated therein from a mixture of two or more gases, as stated hereinabove. For example, it is used in the production of oxygen-enriched air from atmospheric air, the production of $H_2$-enriched gas from a gaseous mixture containing $H_2$ and CO, the removal of $H_2O$ from a gaseous mixture containing $H_2O$, the removal of $SO_2$ and/or nitrogen oxide gases $NO_x$, from a gaseous mixture containing $SO_2$ and/or $NO_x$ and the production of a He-enriched gas from a gaseous mixture containing He. It is preferably used in the production of oxygen-enriched air (with an oxygen content of, for example about 30 to about 45%) from the atmospheric air.

In obtaining a concentrated gas by using the solid membrane of this invention, it is only necessary to provide a difference between the partial pressures of a gas to be concentrated on the two surfaces of the solid membrane. And as the ratio (high pressure/low pressure) between the partial pressures of the gas increases, there is obtained a gas in which the gas to be concentrated is more enriched. For example, in the production of oxygen-enriched air from the atmospheric air, the pressure of the atmospheric air fed to one surface of the solid membrane is increased to more than the atmospheric pressure and the pressure of the other surface is maintained at atmospheric pressure or reduced pressure. Or the pressure of the atmospheric air to be supplied to one surface is maintained at atmospheric pressure and the pressure of the other surface is reduced.

In order to obtain a gas having a specified gas concentrated therein from a gaseous mixture of two or more gases by means of the solid membrane of the invention, it is convenient to use the solid membrane in the form of a module made by first building unit elements from the composite film (the porous sheet-like material having the solid membrane supported thereon) and assembling them into a module. The present invention also provides such a module.

The module of this invention comprises a plurality of unit elements for concentration of gases each of which consists of a solid support plate and the aforesaid composite film laminated on one or both surfaces of the solid support plate so that the porous sheet-like material of the composite film contacts the solid support plate. It is characterized in that (1) each of said unit elements has a first gas drawing port for drawing off a gas having a specified gas concentrated therein, and the pressure drop in a passage for the concentrated gas in the unit elements is not more than about 2 mmHg per cm in a direction away from the first gas drawing port;

(2) the module has a common feed port for feeding a mixture of at least two gases to the solid membrane surface of each unit element, a second drawing port connected to the first gas drawing port of each of said unit elements, and a third common drawing port for drawing off the remaining gases formed as a result of concentration by each of the unit elements; and (3) in each of the unit elements, the flow of the gaseous mixture is concurrent, countercurrent, or angularly displaced, to the flowing direction of the concentrated gas.

The critical feature of the module of this invention is that it has the second common gas drawing port connected to the first gas drawing port of each of the unit elements for drawing the concentrated gas, and the pressure drop for the concentrated gas in each of the unit element is not more than about 2 mmHg per cm in a direction away from the first gas drawing port. The module of this construction is compact and light in weight and has excellent separating efficiency.

In the unit elements of this invention, the solid support plate can be effectively used by placing the solid membrane (composite film) on its surfaces. This means that the membrane area per unit element can be maximized. In other words, if the area of the solid membrane required for gas permeation is constant, the number of unit elements can be minimized, and a compact and light-weight module can be built.

The solid support in the module of this invention has the dual function of stabilizing the form of the unit elements to support the solid membrane and of forming a passage for a concentrated gas which has permeated through the solid membrane. If the gas has difficulty flowing through the passage, the pressure drop increases, and therefore, the difference between the pressures exerted on both surfaces of the solid membrane is small. Hence, the amount of the gas permeated decreases proportionally to such a difference in pressure.

It is known that separation of a gaseous mixture becomes better (the gas separating ability is better) as the ratio of the pressures exerted on both surfaces of the solid membrane (the ratio of the pressure on the higher pressure side to the pressure on the lower pressure side) increases. Accordingly, when the pressure drop in the passage is high, the pressure on the lower pressure side increases and the ratio of the pressures decreases. Consequently, the concentration of the desired gas in the concentrated gas obtained after permeation through the solid membrane decreases.

For this reason, the solid support plate is suitably of a structure which minimizes hampering of the passage for the concentrated gas which has permeated through the solid membrane, namely a structure which minimizes the pressure drop. A solid support plate in which the pressure drop is not more than about 2 mmHg, preferably not more than about 1.5 mmHg, more preferably not more than about 1 mmHg, per cm is preferred.

The pressure drop is measured in this invention in the following manner.

A sample having a length of 50 cm and a width of 25 cm is cut out from the unit element, and the entire surface of the sample is covered with a gas-barrier film. Both 50 cm-long ends of the sample are sealed gas-tight. To both 25 cm-long ends is connected a thick tubular flow opening through which a gas flows without resistance, for example a tube having an inside diameter of about 8 mm. One end of the tube is kept open and adapted for decreasing the opening area, and vacuum suction is effected from the other opening of the tube. When the flow rate of air is 1 liter/min. on the suction side, the pressures at both openings are measured, and the difference between them is defined as the pressure drop. The measurement is made at 25° C.

The solid support plate in the module of this invention is preferably a metal plate such as an aluminum plate, a Duralmin (tradename) plate, a plastic plate such as a polypropylene, hard vinyl chloride resin, fiber-reinforced polyethylene terephthalate or unsaturated polyester plate, or a net-like article such as a stainless steel net or porous polypropylene plate. When the metal plate or the plastic plate other than the net-like article is used as the solid support plate, a spacer is used which forms a sufficient passage for a concentrated gas between the solid support and the composite film. The spacer may also be used when the solid support plate is a net-like article. Various kinds of nets, nonwoven fabrics, porous materials, etc. are used as the spacer. A unit element containing such a spacer can be built by laminating the net, nonwoven fabric, etc. either alone or in combination on one or both surfaces of the solid supp-port, and further laminating the composite film of this invention onto the spacer. It is necessary in this case to laminate these materials such that the pressure drop in each element is within the above-specified range.

The spacer has an action of rendering the flow of a gas through the element easy when the net-like article is not used as the solid support plate, and its selection is especially important. The net preferably has coarse meshes and a raised-and-depressed pattern. It may be made of a plastic or metal, and plastic nets are preferred from the viewpoint of light weight. The plastic nets preferably have stiffness, and for this purpose, such materials as polyethylene, polypropylene, polyethylene terephthalate and polyamides may be used. Examples of comercially available nets are Vexor of Du Pont, Netion of Tokyo Polymer Co., Ltd., and Nips nets of N.B.C. Industrial Co.

The nonwoven fabrics may be made from polyethylene terephthalate, polypropylene, polyethylene, polyamides, etc. For example, Unicell R Type of Teijin Limited, and MF Type of Japan Vilene are commercially available.

A preferred laminated structure in the unit element of the module of this invention consists of a metal plate, a net-like material of both surfaces of the metal plate, a non-woven fabric on both surfaces of the net-like material and a composite film laminated to the surfaces of the nonwoven fabric so that the porous sheet-like material contacts the non-woven fabric. A unit element of this structure shows an especially small pressure drop, has good durability and prevents deformation of the solid membrane of this invention. In particular, the use of the non-woven fabric is advantageous in avoiding rupture of the solid membrane which may occur in the absence of a nonwoven fabric as a result of deformation of the solid membrane along the profile of the net-like material (generally having coarse meshes and an uneven surface). The nonwoven fabric also has an action of making the flow of a gas easy. Accordingly, it is preferred that the nonwoven fabric should have a smooth surface and a smaller mesh opening size than the mesh opening size of the net-like material.

To make the entire module compact, the thickness of the unit element should preferably be as small as possible. It is generally not more than 5 mm, preferably not more than 4 mm, more preferably not more than 3 mm.

As stated hereinabove, the unit element used in this invention has the composite film on both surfaces of one solid support plate. A first gas drawing port is provided in this element in order to draw together the concentrated gas obtained after permeation through the two composite films. The first drawing port should have a cross-sectional area and a length which scarcely permit a pressure drop therein. The unit element having one drawing port for the two solid membranes is characterized by the fact that the number of drawing ports can be reduced to one-half as compared with a member having two drawing ports for two solid membranes, and the number of assembling pipes for assembling the concentrated gas from the drawing ports can be decreased, thus imparting a simple and convenient structure to the unit element and the module.

Excepting the drawing port, the entire periphery of the unit element is sealed up gas-tight. In other words, it is necessary to provide a structure which does not permit mixing of a feed gas and the concentrated gas which has permeated through the solid membrane. To provide such a structure adhesives are preferably used. Examples of preferred adhesives are epoxy resins, and an ionomer resin (Sarlin A ®) formed into a film. When an adhesive in a film form (for instance, Sarlin A ® film) is used, uniform thickness and good gas-tightness can be achieved.

A plurality of unit elements so produced are built into an array of the stacked elements so as to prevent contact of the solid membranes with each other and also to provide a passage through which a gas flows along the outside surface of the solid membrane. The interval between the units is at least 1 mm, preferably at least 2 mm. A preferred array for the production of the module of this invention is the one in which the units at two opposite ends are composed of a solid support plate and the composite film laminated only to its one surface so as to avoid exposure of the solid membrane surfaces.

Spacers of any material are used between the unit elements in building the array. From the viewpoint of the light weight of the module or the firmness of the elements, the spacers are preferably made of a rubber or a plastic. It is sufficient that the spacers are located at the peripheral edges of the elements, and are fixed to the element by, for example, an adhesive.

The array so built is then placed into a box capable of receiving it to provide the module of this invention. In the array within the box, the first gas drawing ports from the individual elements are connected to a single assembling pipe. One end portion of the assembling pipe is drawn from the box to form a second gas drawing port from which the concentrated gas is drawn off.

The box further includes a common feed port for feeding a gas to be concentrated from outside the box, and a third common drawing port for drawing the gas remaining after drawing off the concentrated gas.

The gas to be concentrated which has been fed into the box from the common feed port is concentrated through the solid membranes of the elements while it flows through the passages between the element, thereby giving a concentrated gas (which is drawn out of the box through the second common drawing port) to the inside of the solid membrane, and is discharged as the remaining gas out of the box through the third common drawing port.

The gas to be concentrated which is flowing through the passages between the elements of the array forms a flow which is concurrent, countercurrent, or is angularly displaced to the flowing direction of the concentrated gas given to the inside of the solid membrane. The countercurrent or angularly displaced flow is preferred. By forming such a flow, the module of this invention has an improved separating efficiency.

The module of this invention is advantageously used when a gas to be concentrated is fed at atmospheric pressure from the common feed port, and the second common drawing port from which the concentrated gas is drawn off is connected to a pressure reduction system to reduce the pressure of the passage for the concentrated gas. Such a module is light in weight and compact.

When, for example, oxygen-enriched air is produced from atmospheric air, the amount of the air to be fed to the module is usually at least 5 times, preferably at least 10 times, more preferably at least 30 times, the amount of oxygen-enriched air drawn from the module.

An apparatus for actually obtaining oxygen-enriched air from the atmospheric air using the module of this invention is embodied by an oxygen enricher provided by this invention.

The oxygen-enriched air (gas) obtained by the oxygen enricher of this invention can be used therapeutically for patients with diseases of the respiratory system such as asthma, emphysema and chronic bronchitis, and for industrial applications in small-size combustion furnaces and in aquaculture. The oxygen enricher of this invention is characterized by being light in weight and compact, producing little noise, and being able to produce oxygen-enriched air having a small temperature difference from the temperature of the atmospheric air and having an oxygen concentration of not more than 50%. Accordingly, the oxygen-enriched air obtained from the oxygen enricher of this invention is especially recommended for use in medical therapy.

Inhalation of oxygen-enriched air having an oxygen concentration of more than 60% is known to cause pneumonic ailments or nervous disorders rather than to perform therapy. It is also known that oxygen-enriched air having a large temperature difference from the temperature of the atmospheric air gives an unpleasant feeling to patients. Evidently, a heavy, bulky and noise-making device is inappropriate.

The oxygen enricher of this invention has incorporated therein the module of this invention and further comprises a fan provided in front of the common feed port of the module, a vacuum pump connected to the second common drawing port of the module, cooling and moisture-removing means, an intake-port for the atmospheric air, an opening for discharging the air, and a housing having these members provided therein.

Incorporation of the module into the oxygen enricher can be achieved not only by setting the module of this invention therein, but also by providing the aforesaid array before the building of the module of this invention in a preselected area in the oxygen enricher. The oxygen enricher of this invention includes those in which the module has been incorporated by any of these methods.

The fan takes the air from the air take-in opening, supplies it to the module and discharges it from the discharge opening.

The vacuum pump reduces the pressure of the passages for the oxygen-enriched air in the module and takes out the oxygen-enriched air out of the oxygen enricher so that concentration is effected with good efficiency through the solid membranes of this invention.

In the oxygen enricher, the gas having a reduced oxygen concentration as a result of going through the module is discharged from the air discharging opening after it has cooled the vacuum pump. Before the oxygen-enriched air from the vacuum pump is taken out of the oxygen enricher, it is cooled with the atmospheric air taken into the oxygen enricher from the air take-in opening and preferably the water is removed therefrom. The cooling and water removing means may, for example, be a hose through which oxygen-enriched air can flow. The cooled oxygen-enriched air is taken out of the oxygen enricher without heat exchange with the hot gas to be discharged which has cooled the vacuum pump.

The fan used in this invention should be capable of supplying the atmospheric air into the module in an amount at least 5 times, preferably at least 10 times, more preferably at least 30 times, the amount of oxygen-enriched air to be drawn off from the module. A suitable example of the vacuum pump is the one which does not permit inclusion of fine particles such as oils because the resulting oxygen-enriched air is used for human inhalation. A preferred vacuum pump is of oilless type with suppressed noises and good durability. The ability of the pump varies greatly depending upon the amount of enriched air, the concentration of oxygen, and the performance of the separating membrane. For example, when it is desired to obtain oxygen-enriched air having an oxygen concentration of at least 35% at 6 liters/min. for therapeutic purposes, and for example, the ratio of the oxygen permeation coefficient to nitrogen permeation coefficient of the solid membrane is 3.5, the pump is required to have such a performance as can secure a flow rate of 6 liters/min. at an absolute pressure of 270 mmHg. For example, for use in therapeutic oxygen enrichers, oilless pumps of the diaphragm type made by Gast Corp. and Thomas Corp. of U.S.A. and Iwai Kabushiki Kaisha of Japan, for example, are used preferably.

The gas to be discharged from the module can be utilized for the cooling of the vacuum pump in operation. Preferably, the cooled gas is discharged out of the oxygen enricher through an air duct having at least one winding portion in order to prevent leakage of the pump noises from the oxygen enricher. It is also preferred to apply a sound absorbing material, etc. to the wall of the housing around the pump.

A heat exchanger such as a hose is used as the cooling and water-separating means. In order to cool the oxygen-enriched air with good efficiency by the atmospheric air to a point near the temperature of the atmospheric air through the heat exchanger. It is preferred to provide the heat exchanger immediately near the air take-in opening. Care should be taken so that the surrounding of the heat exchanger is not warmed by the heat of the vacuum pump.

From the standpoint of heat conduction, the heat exchanger is preferably made of a metallic material. A copper material is especially preferred because it also has an antibacterial effect. The heat exchanger may be of any of ordinary types. A preferred type is the one which is compact and permits flowing of water therethrough. Accordingly, a coil-like heat exchanger is preferred. The length of the heat exchanger differs depending upon the amount and temperature of the enriched air. In some case, the length of the coil is desirably more than 1 meter.

The water-separating means serves to separate the water from the enriched air. The simplest means is to introduce water-containing enriched air from a side portion of a cylindrical tube, and separating the air upwardly and the moisture downwardly. To improve the separating efficiency, a packing such as Raschig rings may be put in the cylindrical tube, and it is also possible to provide an obstacle such as a shelf therein. The water which gathers in the lower portion of the water separator is discharged out of it. The manner of discharging is not particularly restricted. For example, a receiver tray is provided to pool the water therein. Or the water is caused to be absorbed by a material capable of well absorbing water, such as a gauze, and then is evaporated. In the latter case, water can be evaporated efficiently by using the exhaust gas which has been used to cool the pump.

If required, the oxygen enricher may also include a column packed with activated carbon or the like for removing noxious gases such as $NO_x$ and $SO_x$ and offensive odors from the enriched air, or a biofilter for removing bacteria from the enriched air. This is also effective for preventing bacterial contamination in the conduit portion for enriched air when the oxygen enricher is out of operation. The oxygen enricher may also include accessory parts such as alarms for detecting and warning an abnormal condition during the operation, timers, flow meters, manometers, etc.

Furthermore, the oxygen enricher of the invention may be built in the structure disclosed in U.S. Pat. No. 3,976,451 or U.S. Pat. No. 4,174,955 using the solid membrane of this invention.

The following Examples illustrate the present invention more specifically.

EXAMPLES 1 TO 4

Allyltrimethylsilane, the ethylenically unsaturated monomers, the catalyst components, and the solvent shown in Table 1 in the amounts indicated were charged into a glass ampoule, and the ampoule sealed up in an atmosphere of nitrogen. The sealed ampoule was shaken for 60 hours in an oil bath at 80° C. to perform the copolymerization of the monomers.

The resulting viscous polymer solution was diluted with toluene, washed fully with a 1 N aqueous solution of hydrochloric acid and water in this sequence, and re-precipitated with methanol. The polymer was purified by a fractional precipitation method.

The results are shown in Table 1.

TABLE 1

| | Composition of the feed charge | | | | | | | |
|---|---|---|---|---|---|---|---|---|
| Example | Allyl-trimethyl-silane (g) | Ethylenically unsaturated monomer (g) | 15% hexane solution of tri-ethyl-aluminum (ml) | 15% hexane solution of TiCl$_4$ (ml) | Hexane (ml) | Amount of the polymer yield (g) | Inherent viscosity ($\eta_{inh}$) (*1) | Proportion of allyltri-methylsilane copolymerized (mole %) (2*) |
| 1 | 3.4 | 4-methyl-pentene-1 (2.5) | 5.9 | 3.3 | 10 | 3.0 | 1.20 | 32.8 |
| 2 | 3.4 | 4-methyl-heptene-1 (3.4) | 5.9 | 3.3 | 10 | 2.5 | 2.24 | 35.5 |
| 3 | 3.4 | 4-methyl-heptene-1 (3.4) | 5.9 | 3.3 | 10 | 3.0 | 1.37 | 24.2 |
| 4 | 2.3 | 4-methyl-heptene-1 (3.4) | 5.9 | 3.3 | 10 | 3.2 | 1.20 | 20.0 |

(*1): $\eta_{inh} = \dfrac{\ln \eta r}{C}$ ; determined at 25° C. for a solution of the polymer in cyclohexane (0.5 g/100 cc).

(*2): Determined by the NMR spectrum.

EXAMPLES 5 TO 7

A glass ampoule was charged with the silicon-containing allyl monomer, ethylenically unsaturated monomers and/or diene unsaturated monomers, solvent (hexane) and catalyst components shown in Table 2 in the amounts indicated, and then sealed up in an atmosphere of nitrogen. The ampoule was shaken for 90 hours in an oil bath maintained at 40° C. to perform the copolymerization of the monomers. The resulting viscous polymer solution was diluted with toluene, well washed with a 1 N aqueous solution of hydrochloric acid, and precipitated in methanol acidified with hydrochloric acid. The resulting polymer was fractionally precipitated to purify it.

The composition of the feed charge and the properties of the resulting polymer are shown in Table 2.

The polymers obtained in these examples all dissolved in toluene to form uniform solutions from which self-supporting membranes could be obtained by casting.

TABLE 2

| | Composition of the feed charge | | | | | | | Proportion |
|---|---|---|---|---|---|---|---|---|
| Example | Silicon-containing allyl monomer (g) | Ethylenically unsaturated monomer and/or diene unsaturated monomer (g) | Catalyst components (mmoles) | | Hexane (ml) | Amount of the copolymer yield (g) | Inherent viscosity ($\eta_{inh}$) (*1) | of the Si-containing allyl monomer (%) (*2) |
| 5 | Allyloctyl-dimethyl-silane (10.6) | 4-methyl-heptene-1 (5.6) | TiCl$_4$ (0.005) | Al(C$_2$H$_5$)$_3$ (0.025) | 20 | 12.2 | 1.65 | 56.1 |
| 6 | Allyl-phenyldi-methyl-silane (8.8) | 4-methyl-heptene-1 (5.6) | TiCl$_4$ (0.005) | Al(C$_2$H$_5$)$_3$ (0.025) | 20 | 10.1 | 1.72 | 58.1 |
| 7 | Allyltri-methyl-silane (2.3) | Styrene (2.1) Isoprene (1.4) | TiCl$_3$ (2) | Al(C$_2$H$_5$)$_3$ (18) | 20 | 2.9 | 1.85 | 13.4 |

(*1) and (*2): The same as the footnote to Table 1.

EXAMPLE 8

(1) A glass ampoule was charged with 68.6 g of allyl-trimethylsilane, 67.4 g of 4-methylheptene-1, 200 ml of n-hexane, 0.18 mole of triethyl aluminum and 0.06 mole of titanium tetrachloride, and sealed up in an atmosphere of nitrogen. The sealed ampoule was rotated for 90 hours in an oil bath maintained at 40° C. to perform the copolymerization of the monomers.

The resulting viscous polymer was diluted with toluene, washed sufficiently with a 1 N aqueous solution of hydrochloric acid and water in this sequence, and re-precipitated in methanol. The polymer was further fractionally precipitated.

Figure 2:
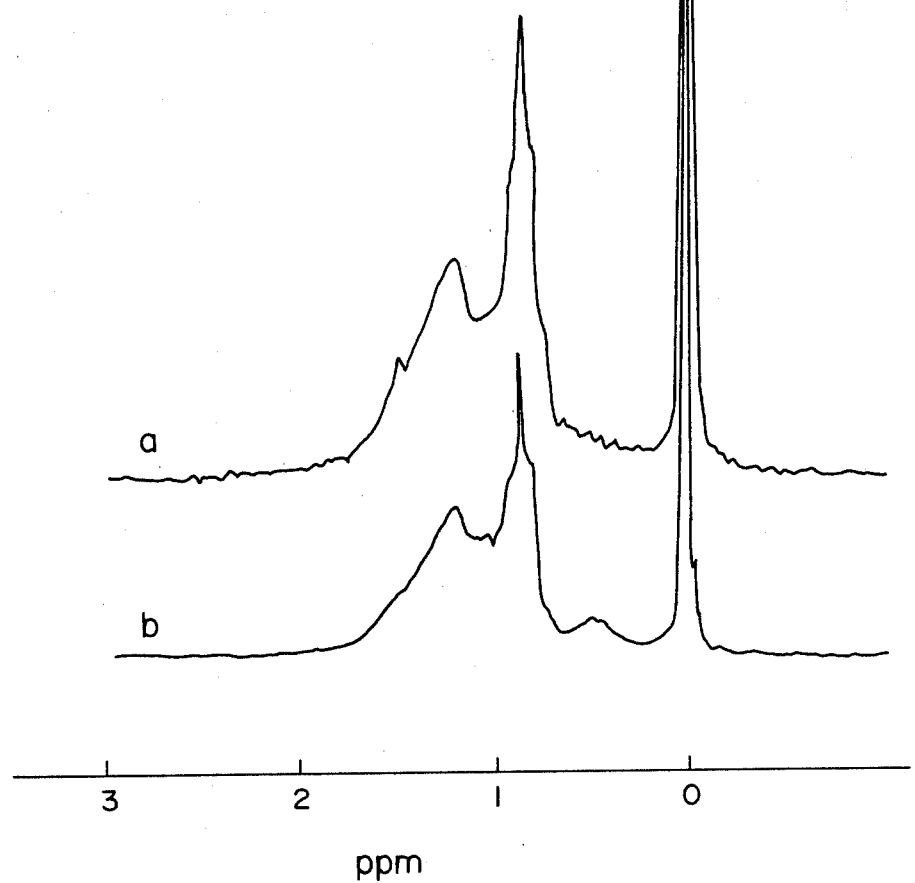

(2) FIGS. 1 and 2 show the GPC (gel-permeation chromatography) charts and NMR spectral charts of the resulting fractionated polymer and the unfractionated polymer are shown in FIGS. 1 and 2.

In FIGS. 1 and 2, a represents the results obtained with the fractionated polymer, and b, the results obtained with the unfractionated polymer. FIG. 2 shows that the fractionated polymer (a) contained about 38.0 mole% of the allyltrimethylsilane unit, and the unfractionated polymer (b) contains 44.9 mole% of the allyltrimethylsilane unit.

The measuring conditions of GPC were as follows:
Column:
  Shodex GPC A80 M (a product of Showa Denko Co., Ltd.)
Column temperature:
  room temperature
Sample:
  500 μl solution with a polymer concentration of 0.2%
Eluent:
  Chloroform
Flow rate:
  1.0 ml/min.
Instrument:
  ALC-GPC 244 (a product of Waters Associate Co.) equipped with a detector (R401, made by Waters Associate Co.) having a sensitivity of $4 \times 10^{-5}$ RI-Unit full scale.

(3) The fractionated polymer was compared in X-ray diffraction and differential thermal analysis with a homopolymer of allyltrimethylsilane and a homopolymer of 4-methylheptene-1 which were separately prepared.

Figure 3:
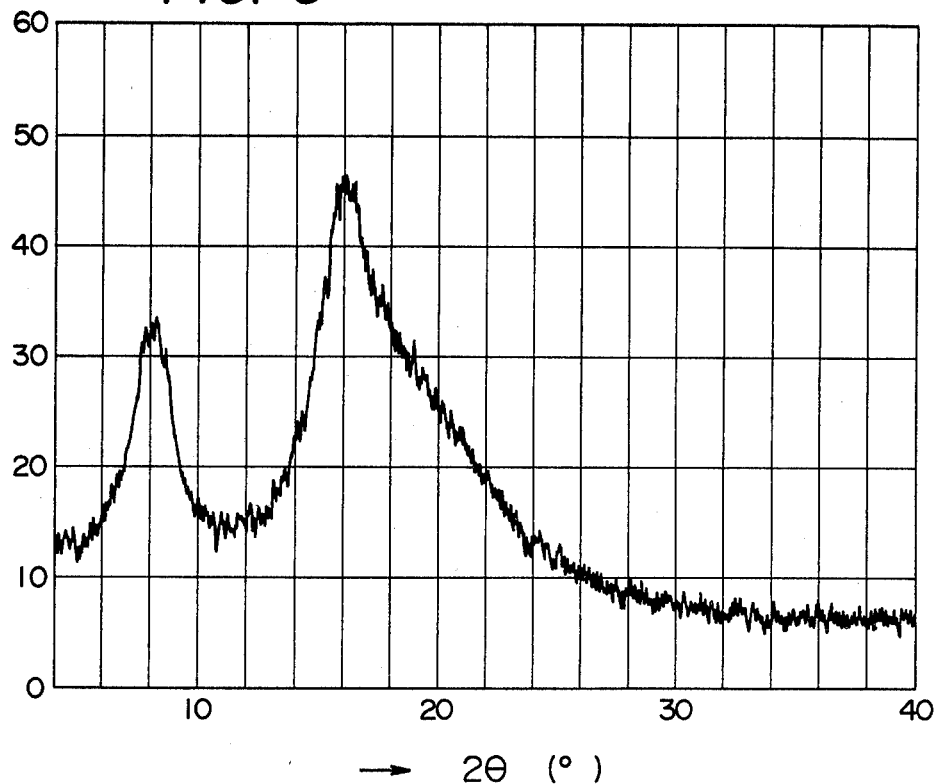
Figure 4:
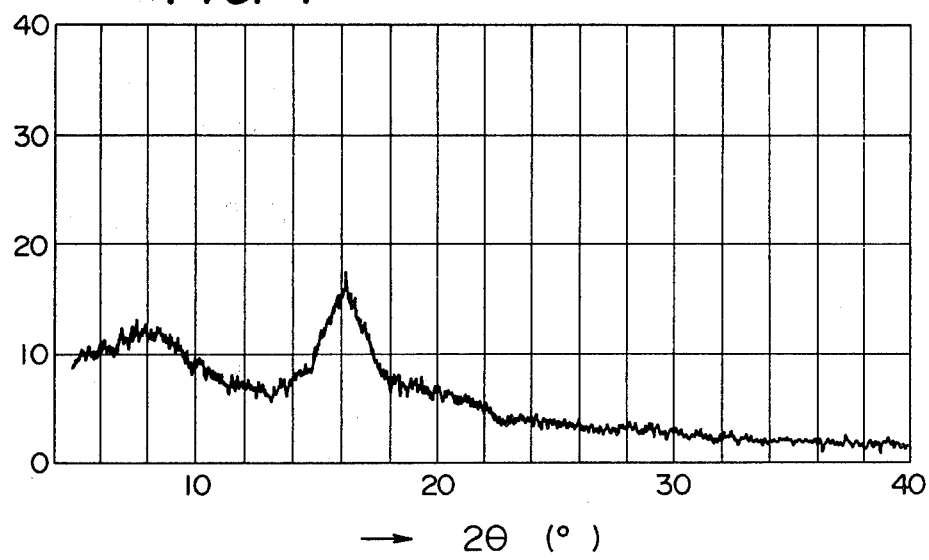
Figure 5:
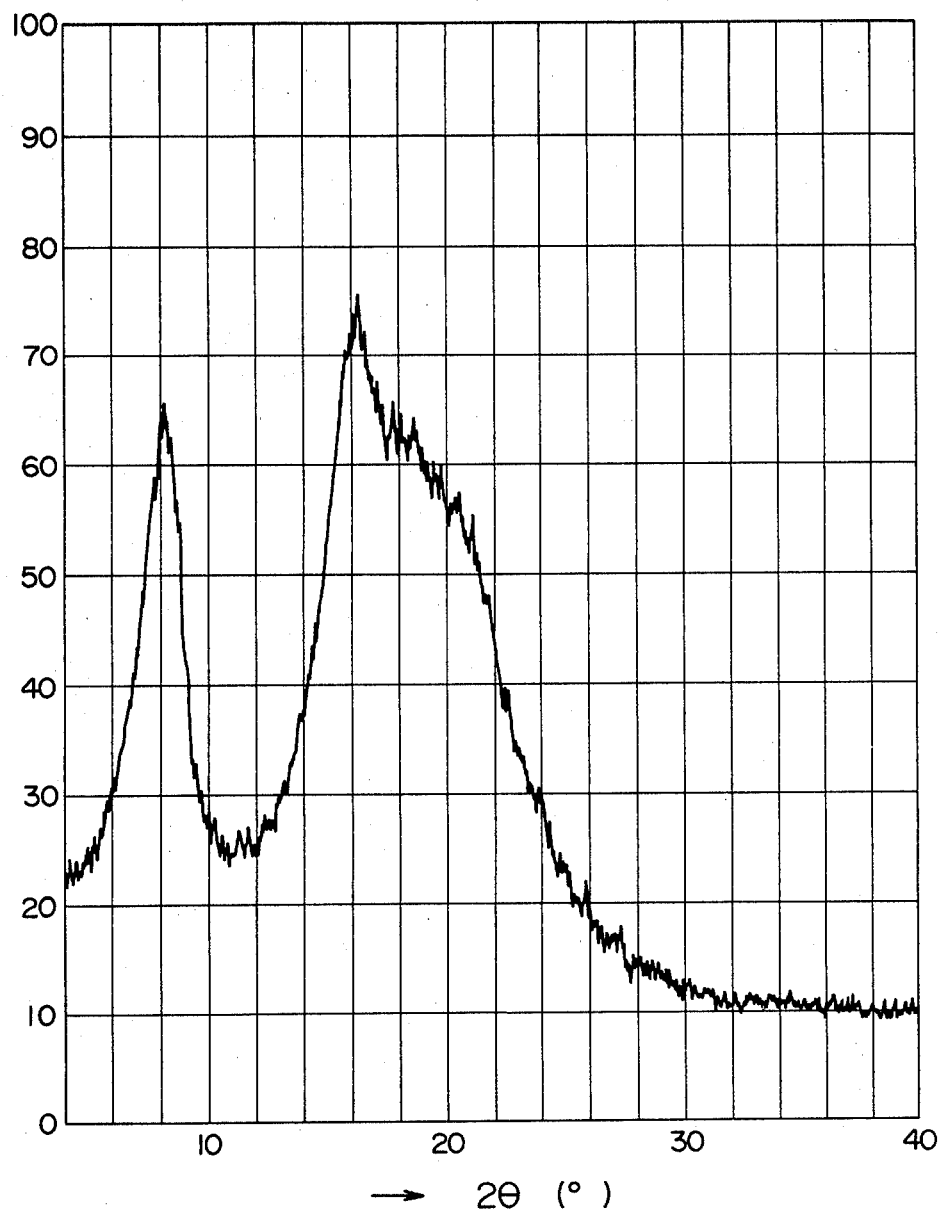

FIGS. 3, 4 and 5 respectively show the X-ray diffraction intensity chart of the fractionated polymer, the X-ray diffraction intensity chart of the homopolymer of allyltrimethylsilane, and the X-ray diffraction intensity chart of the homopolymer of 4-methylheptene-1.

FIGS. 6 and 7 respectively show the DTA chart of the fractionated polymer and the DTA chart of the allyltrimethylsilane polymer.

The X-ray diffraction analysis was performed under the following conditions.
Target: Cu
Filter: Ni
Voltage: 40 KV
Current: 30 mA
Instrument: X-ray diffraction device (Model 4032 of Rigaku Denki Co., Ltd.)

The DTA was measured under the following conditions.
Atmosphere: $N_2$
Heating rate: 10° C./min.
Instrument: differential thermal balance (Model CN-8002S2 of Rigaku Denki Co., Ltd.)

(4) It is seen from a comparison of the X-ray diffraction intensity charts of FIGS. 3 to 5 and a comparison of the DTA charts of FIGS. 6 and 7 that the silicon-containing copolymer of the invention exhibits a different crystal structure and thermal behavior from the homopolymer of allyltrimethylsilane and the homopolymer of 4-methylheptene-1.

$C^{13}$-NMR spectroscopy led to the determination that the chemical shift value of a peak assigned to the allyltrimethylsilane unit of the silicon-containing copolymer of the invention evidently differs from that of the homopolymer of allyltrimethylsilane.

The above results, taken together, show that the silicon-containing copolymer of the invention consists of polymer chains in which the allyltrimethylsilane unit is adjacent to the 4-methylheptene-1 unit.

EXAMPLE 9

A solution was prepared by dissolving 4 parts by weight of poly[(allyltrimethylsilane)-(4-methylheptene-1)] (the proportion of copolymerized allyltrimethylsilane determined by NMR was 38 mole%, and its inherent viscosity determined at 25° C. for a solution of the polymer in cyclohexene in a concentration of 0.5 g/100 ml was 2.09) in a solvent consisting of 93.12 parts by weight of cyclohexane and 2.88 parts by weight of cyclohexenyl hydroperoxide.

The solution was maintained at 50° C., and one drop of it was let fall on the surface of stationary water as a liquid support maintained at 15° C. from an opening having a cross sectional area of about 2 $mm^2$ and located about 10 mm above the water surface.

The droplet of the solution immediately spread on the water surface and gave a circular solid membrane having the site of falling substantially as a center. This operation was repeated to obtain a solid membrane having an average membrane area of 441 $cm^2$.

The solid membrane so formed on the water surface was closely contacted with and supported on a porous polypropylene membrane by pushing it below the water surface. This operation was repeated twice to give a composite membrane consisting of two solid membranes on the porous membrane. The oxygen permeation factor of this composite membrane was $5.4 \times 10^{-4}$ cc (STP)/$cm^2$.sec.cm Hg, and the ratio of the oxygen permeation factor to the nitrogen permeation factor (to be referred to as "selectivity") was 3.7.

The surface tension (c) of water at 25° C., the surface tension (a) of the solution, and the surface tension (b) of water and solution were 720, 21.2, and 9.0 dynes/cm, respectively, and the $[c_1-(a_1+b_1)]$ value calculated from these (to be sometimes referred to as a spreading wet factor) was 41.8 dynes/cm.

The distribution factor (the concentration in cyclohexane divided by the concentration in water) of cyclohexenyl hydroperoxide was 2.6.

EXAMPLE 10 TO 14

Example 9 was repeated except that cyclohexylamine, cyclohexanol, benzoic acid, cyclohexenone or benzaldehyde was used instead of cyclohexenylhydroperoxide. The liquid surface properties, and the permeating properties of the resulting solid membranes were measured, and the results are shown in Table 3.

COMPARATIVE EXAMPLE 1

Example 9 was repeated except that a solution of 4 parts of poly[(allyltrimethylsilane)-(4-methylheptene-1)] in 96 parts of cyclohexene was used instead of the solvent solution used in Example 9. The liquid surface properties, and the permeating properties of the resulting solid membrane were measured, and the results are shown in Table 3.

EXAMPLE 15 AND 16

Example 9 was repeated except that toluene or trichloroethylene was used instead of cyclohexene. The liquid surface properties, and the permeating properties of the resulting solid membranes were measured, and the results are shown in Table 3.

COMPARATIVE EXAMPLE 2

The same operation as in Example 9 was performed except that ethanol was used instead of cyclohexenyl hydroxyperoxide. The solution did not spontaneously spread, but the polymer was precipitated, thus making it impossible to form a membrane. The liquid surface properties were measured, and the results are shown in Table 3.

TABLE 3

|  | | | Example 17 | Example 18 |
|---|---|---|---|---|
| peroxide | | | 2.85 | 2.85 |
| Poly[(allyltrimethylsilane)-(4-methylheptene-1)] | | | 4.75 | 4.50 |
| Poly(4-methylpentene-1) | | | 0.25 | 0.50 |

| Example | Silicon-containing copolymer | Solvent | Other organic compound in the solvent Type | Distribution coefficient |
|---|---|---|---|---|
| 9 | Poly[(allyltrimethylsilane)-(4-methylheptene-1)] | Cyclohexene | Cyclohexenyl-hydroperoxide | 2.6 |
| 10 | Poly[(allyltrimethylsilane)-(4-methylheptene-1)] | Cyclohexene | Cyclohexylamine | 3.8 |
| 11 | Poly[(allyltrimethylsilane)-(4-methylheptene-1)] | Cyclohexene | Cyclohexanol | 2.2 |
| 12 | Poly[(allyltrimethylsilane)-(4-methylheptene-1)] | Cyclohexene | Benzoic acid | 6.4 |
| 13 | Poly[(allyltrimethylsilane)-(4-methylheptene-1)] | Cyclohexene | Cyclohexenone | 1.8 |
| 14 | Poly[(allyltrimethylsilane)-(4-methylheptene-1)] | Cyclohexene | Benzaldehyde | 23.5 |
| 15 | Poly[(allyltrimethylsilane)-(4-methylheptene-1)] | Toluene | Cyclohexenyl hydroperoxide | 4.5 |
| 16 | Poly[(allyltrimethylsilane)-(4-methylheptene-1)] | Trichloroethylene | Cyclohexenyl hydroperoxide | 4.1 |
| CEx. 1 | Poly[(allyltrimethylsilane)-(4-methylheptene-1)] | Cyclohexene | None | — |
| CEx. 2 | Poly[(allyltrimethylsilane)-(4-methylheptene-1)] | Cyclohexene | Ethanol | —0 |

| Example | Liquid surface properties | | | | Permeating properties of the solid membrane | |
|---|---|---|---|---|---|---|
|  | Surface tension of the solution (dynes/cm) | Interfacial tension between the solution and water (dynes/cm) | Spreading wet factor (dynes/cm) | Area of the membrane (cm$^2$) | Oxygen permeating velocity $\left(\frac{CC\ (STP)}{cm^2 \cdot sec \cdot cmHg}\right)$ | Selectivity (O$_2$/N$_2$) |
| 9 | 21.2 | 9.0 | 41.8 | 441 | 5.4 × 10$^{-4}$ | 3.7 |
| 10 | 15.8 | 15.3 | 40.9 | 330 | 5.4 × 10$^{-4}$ | 3.2 |
| 11 | 19.0 | 15.6 | 37.4 | 258 | 3.5 × 10$^{-4}$ | 3.5 |
| 12 | 18.6 | 19.0 | 34.4 | 299 | 6.4 × 10$^{-4}$ | 3.0 |
| 13 | 20.5 | 19.2 | 32.3 | 291 | 5.2 × 10$^{-4}$ | 3.6 |
| 14 | 16.1 | 29.0 | 26.9 | 298 | 4.3 × 10$^{-4}$ | 3.5 |
| 15 | 16.3 | 17.0 | 38.7 | 207 | 5.4 × 10$^{-4}$ | 4.3 |
| 16 | 21.0 | 14.0 | 37.0 | 345 | 4.4 × 10$^{-4}$ | 3.0 |
| CEx. 1 | 18.4 | 41.2 | 12.4 | 79 | Fine pores formed, and a membrane was not formed. | |
| CEx. 2 | 16.9 | 16.3 | 38.8 | 56 | A membrane cannot be formed because the polymer precipited. | |

CEx. = Comparative Example

EXAMPLE 17 AND 18

Solutions of the following formulations (parts by weight) were prepared.

| | Example 17 | Example 18 |
|---|---|---|
| Cyclohexene | 92.15 | 92.15 |
| Cyclohexenyl hydroxy- | | |

Each of these solutions was formed into a solid membrane by the same operation as in Example 9. The liquid surface properties, and the permeating properties of the solid membranes were measured, and the results are shown in Table 4.

The poly[(allyltrimethylsilane)-(4-methylheptene-1)] used in Examples 17 and 18 was the same as that used in Example 9.

TABLE 4

| Example | Polymer blend (wt. %) | Solvent | Other organic compound in the solvent | |
|---|---|---|---|---|
| | | | Type | Distribution coefficient |
| 17 | 95% of Poly[(allyltrimethylsilane)-(4-methylheptene-1)] and 5% of poly-(4-methylpentene-1) | Cyclohexene | Cyclohexenyl hydroperoxide | 2.6 |
| 18 | 90% of Poly[(allyltrimethylsilane)-(4-methylheptene-1)] and 10% poly(4-methylpentene-1) | Cyclohexene | Cyclohexenyl hydroperoxide | 2.6 |

| | Liquid surface properties | | | | Permeating properties of the solid membrane | |
|---|---|---|---|---|---|---|
| Example | Surface tension of the solution (dynes/cm) | Interfacial tension between the solution and water (dynes/cm) | Spreading wet factor (dynes/cm) | Area of the membrane (cm²) | Oxygen permeating velocity $\left(\frac{CC\,(STP)}{cm^2 \cdot sec \cdot cmHg}\right)$ | Selectivity (O₂/N₂) |
| 17 | 20.0 | 16.4 | 35.6 | 345 | $6.2 \times 10^{-4}$ | 3.3 |
| 18 | 14.8 | 16.6 | 40.6 | 328 | $4.8 \times 10^{-4}$ | 3.8 |

EXAMPLE 19

Example 9 was repeated except that poly[(allyltrimethylsilane)-(heptene-1)] (copolymerization ratio 35:65; $\eta_{inh}=1.85$) was used instead of the poly[(allyltrimethylsilane)-(4-methylheptene-1)] used in Example 9. The liquid surface properties, and the permeating properties of the resulting solid membrane was measured, and the results are shown in Table 5.

EXAMPLE 20

A solution was prepared by dissolving 4.00 parts of poly[(allyltrimethylsilane)-(isoprene)] (copolymerization ratio 48:52; $\eta_{inh}=1.70$) in a solvent consisting of 93.12 parts by weight of toluene and 2.88 parts by weight of cyclohexenyl hydroperoxide.

A solid membrane was produced in the same way as in Example 9 except that the solution prepared as above was used. The liquid surface properties, and the permeating properties of the solid membrane were measured, and the results are shown in Table 5.

EXAMPLE 21

Example 9 was repeated except that poly[(allyl-t-butyldimethylsilane)-(4-methylheptene-1)] (copolymerization ratio 46:34; $\eta_{inh}=2.10$) was used instead of the poly[(allyltrimethylsilane)-(4-methylheptene-1)]. The liquid surface properties, and the permeating properties of the resulting solid membrane were measured, and the results are shown in Table 5.

TABLE 5

| Example | Silicon-containing polymer | Solvent | Other organic compound in the solvent | |
|---|---|---|---|---|
| | | | Type | Distribution coefficient |
| 19 | Poly[(allyltrimethylsilane)-(heptene-1)] | Cyclohexene | Cyclohexenyl hydroperoxide | 2.6 |
| 20 | Poly[(allyltrimethylsilane)-(isoprene)] | Toluene | Cylcohexenyl hydroperoxide | 4.5 |
| 21 | Poly[(allyl t-butyl-dimethylsilane)-(4-methylheptene-1)] | Cyclohexene | Cyclohexenyl hydroperoxide | 2.6 |

| | Liquid surface properties | | | | Permeating properties of the solid membrane | |
|---|---|---|---|---|---|---|
| Example | Surface tension of the solution (dynes/cm) | Interfacial tension between the solution and water (dynes/cm) | Spreading wet factor (dynes/cm) | Area of the membrane (cm²) | Oxygen permeating velocity $\left(\frac{CC\,(STP)}{cm^2 \cdot sec \cdot cmHg}\right)$ | Selectivity (O₂/N₂) |
| 19 | 22.8 | 12.7 | 36.5 | 337 | $6.5 \times 10^{-4}$ | 3.0 |
| 20 | 19.8 | 16.5 | 35.7 | 240 | $6.0 \times 10^{-4}$ | 3.0 |
| 21 | 21.5 | 10.5 | 40.0 | 410 | $5.5 \times 10^{-4}$ | 3.3 |

EXAMPLES 22 AND 23

Example 9 was repeated except that the copolymer of Example 1 or Example 2 was used as the silicon-containing copolymer. The permeating properties of the resulting solid membranes were measured, and the results are shown in Table 6.

TABLE 6

| Example | Co-polymer | Gas permeating velocity $(\times 10^{-4})$ | | | Selectivity (PO₂/PN₂) |
|---|---|---|---|---|---|
| | | PN₂ | PO₂ (*) | PCO₂ $\left(\frac{CC\,(STP)}{cm^2 \cdot sec \cdot cmHg}\right)$ | |
| 22 | Co-polymer of Example 1 | 1.2 | 4.5 | 15.6 | 3.8 |
| 23 | Co-polymer | 1.5 | 5.1 | 20.0 | 3.3 |

TABLE 6-continued

| | | Gas permeating velocity | | | |
|---|---|---|---|---|---|
| Example | Co-polymer | (× 10⁻⁴) $PN_2$ | (*) $PO_2$ | $\left(\dfrac{CC\ (STP)}{cm^2 \cdot sec \cdot cmHg}\right)$ $PCO_2$ | Selectivity $(PO_2/PN_2)$ |
| | of Example 2 | | | | |

(*): Measured at 25° C. by using a gas permeability measuring device made by Rika Seiki Kogyo Co., Ltd.

What we claim is:

1. An ultrathin solid membrane capable of producing a concentrated gas from a mixture of two or more gases, especially for obtaining an oxygen-enriched gas from a gaseous mixture containing oxygen gas, said solid membrane having a thickness of from about 50 to about 3,000 Å and being composed substantially of a film-forming silicon-containing copolymer consisting substantially of (a) at least one recurring unit of the following formula

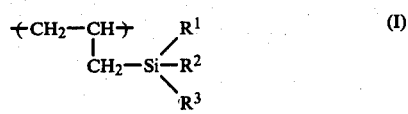

wherein $R^1$, $R^2$ and $R^3$ are identical or different, and each represents an alkyl group having 1 to 10 carbon atoms, or a phenyl group which may be substituted by an alkyl group having 1 to 4 carbon atoms, and (b) at least one additional recurring unit selected from recurring units of the formula (II-1) and (II-2):

wherein $R^4$ represents a hydrogen atom or an alkyl group having 1 to 3 carbon atoms, and $R^5$ represents a hydrogen atom, an alkyl or alkenyl group having 1 to 20 carbon atoms, or a phenyl group which may be substituted by an alkyl group having 1 to 4 carbon atoms; and

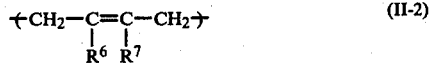

wherein $R^6$ and $R^7$ are identical or different, and each represents a hydrogen atom, a chlorine atom, or a methyl group, the proportion of said recurring unit of formula (I) being about 5 to about 95 mole% based on the total recurring units of the silicon-containing copolymer and said silicon-containing copolymer having an inherent viscosity, measured at 25° C. for a solution of 0.5 g of the copolymer in 100 cc of cyclohexane, of about 0.5 to about 4.0.

2. The solid membrane of claim 1 wherein in the recurring unit of formula (I), $R^1$ and $R^2$ are identical or different alkyl groups having 1 to 5 carbon atoms, and $R^3$ is an alkyl group having 1 to 8 carbon atoms, or a phenyl group.

3. The solid membrane of claim 1 wherein in the recurring unit of formula (I), all of $R^1$, $R^2$ and $R^3$ are methyl groups.

4. The solid membrane of any one of claims 1, 2, or 3 which consists substantially of the recurring unit of formula (I) and the recurring unit of formula (II-1).

5. The solid membrane of claim 4 wherein in the recurring unit of formula (II-1), $R^4$ is a hydrogen atom or an alkyl group having 1 to 3 carbon atoms, and $R^5$ is a hydrogen atom or an alkyl or alkenyl group having 1 to 6 carbon atoms.

6. The solid membrane of claim 4 wherein in the recurring unit of formula (II-1), $R^4$ is a hydrogen atom, and $R^5$ is an alkyl group having 2 to 6 carbon atoms.

7. The solid membrane of claim 4 wherein in the recurring unit of formula (II-1), $R^4$ is a hydrogen atom, and $R^5$ is a butyl, pentyl or hexyl group.

8. The solid membrane of claim 1 wherein the recurring unit of formula (II-2) is present and $R^6$ is a hydrogen atom and $R^7$ is a hydrogen atom or a methyl group.

9. The solid membrane of claim 1 wherein the proportion of the recurring unit of formula (I) is about 20 to about 80 mole% based on the entire recurring units of the silicon-containing copolymer.

10. The solid membrane of claim 1 wherein said silicon-containing copolymer is prepared by copolymerizing a silicon-containing allyl monomer of the formula

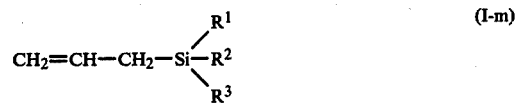

wherein $R^1$, $R^2$ and $R^3$ are as defined above, and at least one additional unsaturated monomer selected from the group consisting of an ethylenically unsaturated monomer of the formula

wherein $R^4$ and $R^5$ are as defined above, and a diene unsaturated monomer of the formula

wherein $R^6$ and $R^7$ are as defined above, in the presence of a Ziegler-Natta catalyst in an aprotic inert solvent at a temperature of about 10° to about 120° C.

11. The solid membrane of claim 1 which is carried on a porous sheet-like material.

12. A composite film membrane comprising a porous sheet-like material supporting thereon a laminate of the ultrathin solid membrane of claim 1 and another solid membrane able to separate gases, said laminate having a total thickness in the range of about 50 to about 5,000 Å.

13. The composite film of claim 12 wherein the other solid membrane is an ultrathin solid membrane of poly(4-methylpentene-1).

* * * * *

UNITED STATES PATENT AND TRADEMARK OFFICE
CERTIFICATE OF CORRECTION

PATENT NO. : 4,393,113
DATED : July 12, 1983
INVENTOR(S) : Kiyoshi Sugie; Takeyoshi Yamada and Teizo Yamaji It is certified that error appears in the above—identified patent and that said Letters Patent is hereby corrected as shown below:

Please correct the spelling of the Assignee to read as "Teijin Limited"

Signed and Sealed this

Fifteenth Day of November 1983

[SEAL]

Attest:

GERALD J. MOSSINGHOFF

Attesting Officer

Commissioner of Patents and Trademarks